US012569796B2

(12) United States Patent
Scaife

(10) Patent No.: US 12,569,796 B2
(45) Date of Patent: Mar. 10, 2026

(54) DRUM FILTERS AND FILTER SYSTEMS COMPRISING SUCH DRUM FILTERS

(71) Applicant: MobiAir PTE. LTD., Singapore (SG)

(72) Inventor: Martin Scaife, Singapore (SG)

(73) Assignee: MobiAir PTE. LTD. (SG)

( * ) Notice: Subject to any disclaimer, the term of this patent is extended or adjusted under 35 U.S.C. 154(b) by 480 days.

(21) Appl. No.: 18/253,568

(22) PCT Filed: Nov. 17, 2021

(86) PCT No.: PCT/SG2021/050711
§ 371 (c)(1),
(2) Date: May 18, 2023

(87) PCT Pub. No.: WO2022/108531
PCT Pub. Date: May 27, 2022

(65) Prior Publication Data
US 2024/0009610 A1     Jan. 11, 2024

(30) Foreign Application Priority Data

Nov. 19, 2020    (GB) .................................... 2018157.4
Dec. 31, 2020    (GB) .................................... 2020814.6

(51) Int. Cl.
| | |
|---|---|
| *B01D 46/26* | (2006.01) |
| *B01D 46/00* | (2022.01) |
| *B01D 46/44* | (2006.01) |
| *B01D 46/69* | (2022.01) |

(52) U.S. Cl.
CPC ......... *B01D 46/26* (2013.01); *B01D 46/0049* (2013.01); *B01D 46/0056* (2013.01); *B01D 46/44* (2013.01); *B01D 46/69* (2022.01); *B01D 2271/02* (2013.01); *B01D 2273/30* (2013.01)

(58) Field of Classification Search
None
See application file for complete search history.

(56) References Cited

U.S. PATENT DOCUMENTS

| | | | |
|---|---|---|---|
| 4,481,021 A | 11/1984 | Kinney, Jr. et al. | |
| 10,695,707 B2 * | 6/2020 | White, Jr. .......... | B01D 46/0043 |
| 2016/0001211 A1 | 1/2016 | Dietz | |
| 2016/0067644 A1 | 3/2016 | Scaife | |
| 2025/0311734 A1 * | 10/2025 | Brandon Sutton .... | A01N 63/50 |
| 2025/0319494 A1 * | 10/2025 | Goodine .............. | B07C 5/3422 |

FOREIGN PATENT DOCUMENTS

| | | |
|---|---|---|
| CN | 107754488 A | 3/2018 |
| EP | 0095354 A1 | 11/1983 |

* cited by examiner

*Primary Examiner* — Brit E. Anbacht
(74) *Attorney, Agent, or Firm* — Jordan IP Law, LLC

(57) ABSTRACT

The present invention is a highly efficient and easily shippable drum filter device comprising segmented filter media, easy to manufacture light-weight drum segments or torsional tensioning elements. Preferably, it comprises bulged side wall, that can be fitted after shipment and that can be readily opened for easy access to the filter. The drum filter device can be incorporated into a filtering system further.

12 Claims, 14 Drawing Sheets

DRUM FILTERS AND FILTER SYSTEMS COMPRISING SUCH DRUM FILTERS

FIELD OF THE INVENTION

The present invention relates to improvements for rotary vacuum dust drum filters and to filter systems comprising at least a drum filter.

BACKGROUND

Rotary vacuum drum filters as filtering elements for removing dust from an air flow are well known in the art, e.g. U.S. Pat. No. 2,732,912 discloses the separation of particles from gases in which they are suspended and is more particularly concerned with a novel rotary filter type of apparatus for continuously separating out and collecting such particles from a gaseous vehicle in a much improved and highly efficient manner. A special application area is to clean particle loaded air, such as may be used for the application in production of hygiene articles, wherein the dust may include fluff fibers and/or superabsorbent powder. WO2014/173984 (hereinafter referred to as "WO'984", Scaife) describes a filtering system comprising a drum air filtration device.

Rotary drum filters typically comprise a drum filter housing with filter space, to which particle loaded air is supplied, with one end closed off, and the opposite end comprising an air suction device. Further a filter media support in drum form, typically rotating around a horizontal axis; filter media positioned on the outward surface of the filter media support; seals for separating the filter space from the inside of the drum.

During operation, the suction device is adapted to suck the particle loaded air through the filter media, where the particles, or at least a portion thereof, are withheld, into the inner part of the drum, from where the cleaned air can be processed further.

Apart from filter media properties, the air flow rate and the filter media surface are key design criteria for the equipment and its operation.

The air flow rate, in turn, is determining the energy consumption of the suction device, which should be minimized for cost and environmental considerations.

One way to achieve this is to maximize the size of the filter media surface area. However, large sized filters are difficult to transport to the place of operation, and the filter media are difficult to handle, e.g. when these are worn and need replacement or a thorough cleaning.

Another important factor for minimizing the energy consumption relates to the efficiency of the main fan system that pulls an appropriate amount of air through the filter media.

Yet a further design parameter relates to the filter housing, confining the filter space. First, the housing must be able to withstand the normal operating conditions of the operation, in particular the pressure conditions. As the air is sucked by the suction device through the filter media, there will also be a certain underpressure outside of the filter media.

Further, typically the filtering equipment is manufactured at a different location than where it is operated. Henceforth, it is highly desirable that the size and weight of the equipment is such that it allows easy and simple transportation.

It is known that such a filter equipment has preferably dimensions according to ISO shipment container, e.g. the above referenced WO'984".

Further, the weight should be minimized to ease transportation and to also minimize resources for the manufacturing of the filter devices.

Yet a further design element relates to the accessibility of elements inside the housing. In particular, the filter media may need inspection or attention for repair or even replacement.

Further, there is a desire to provide particular drum filter elements useful in such systems that satisfy the above requirements, by providing a maximized filter media surface area, in particular for a system as may be readily transported with given, preferably ISO, dimensions and which has a container housing which withstands the operating conditions at minimum weight and provides easy access to the filter media and execution of repair or replacement. Thus, it is desirable to have a system which exhibits a transport size that is maximised to fit a standard ISO container at a maximized filter area. Further, it is desirable to minimize the weight of the unit for the transport.

It is also known to combine several filter devices in a filter system, with or without additional stages of other filtering elements, such as self-cleaning filter stages, also referred to as active filter comprising an automatic method for cleaning itself without operator intervention, and passive filter stages not having self-cleaning capabilities, such as pocket or bag filter. For example, in U.S. Pat. No. 10,596,505B1, the combination of a drum filter with two passive filters is described.

However, there is still the need to combine various filter devices in a most effective way.

SUMMARY

The present invention is a rotary drum filter device for filtering particle loaded air, the drum filter device
  comprising
  a housing,
    comprising
      reinforcement ribs,
      closure plates,
      access doors,
      particle loaded air inlet,
      clean air outlet
      particle enriched air outlet, connected to a particle
        enriched air suction device;
  a filter media support drum
    rotatably mounted around a drum axis,
    comprising at least two, preferably at least 3, more
      preferably a multiple of 3, filter media support seg-
      ments
      the filter media support segments forming drum
        segments that are co-axially mounted on the drum
        axis,
  filter media segments,
    each one being positioned outwardly of and covering a
      segment of the filter media support segments,
    adapted to be removably connected to the filter media
      support segments;
  at least one main fan connected to the clean air outlet of
    the housing.

In a first execution, the filter media support drum further comprises grooves between each two filter media support segments, preferably essentially air-tight connection grooves, and the reinforcement ribs fit into the connection grooves of the filter media support drum.

In a second execution, the drum axis comprises support bearings, preferably only at the end sections of the axis, and the drum segments comprise spokes, preferably positioned longitudinally centred in each of the drum segments, wherein further the drum air filter device further comprises torsional tensioners extending from the support bearings to outwardly positioned tensioning points of the spokes of the drum segments, preferably to each of the circumferential support spars of the drum segments, and preferably four torsional tensioners for each of the circumferential support spars.

In a third execution, the drum segments comprise radial and longitudinal support spars, And at least the drum segments and support spars are manufactured from lightweight materials, preferably aluminium/aluminium alloys, and are further preferably assembled without welding.

Preferably, the elements of at least two of these executions are combined.

A rotary drum filter device may further comprise at least one element selected from the group consisting of at least one, preferably all of the access doors of the housing is/are adapted to be translatorily slid from a closed to an open configuration by means of support arms, wherein preferably the support arms are positioned at the front and rear end of the housing;

the housing is adapted to fit into the size and through the door of an ISO 668 type 1AA container, wherein a support skid, side portions, preferably executed as doors, and main fan system(s) are adapted to be removable for transport;

a speed control system for controlling the speed of the one or more main drive fan(s), comprising a data storage system comprising a pre-set drive fan speed versus time correlation, adapted for a virgin filter media;

a main fan drive speed control unit adapted to adjust the main fan drive speed according to the pre-set correlation, preferably a pressure sensor inside the housing, adapted to create a signal for either initiating an emergency shut off of the main fan(s) or for alerting an operator;

a drum seal system comprising a first surface and a second sealing surface, wherein one of the surfaces is connected to the housing, and wherein the other of the surfaces is connected to the rotatably mounted filter media support drum, wherein the surfaces are pressed against each other by air pressure bellows.

In another aspect, the present invention is a filter system comprising any execution of a rotary drum filter device according to any of the preceding claims, further comprising an active filter downstream of the drum filter device;

and optionally a passive filter device positioned downstream of the active filter device and upstream of the main fan system.

BRIEF DESCRIPTION OF THE FIGURES (TO BE REVISED)

FIG. 1A to D depict various aspects of a drum filter device according to the present invention.

Figure 3B:
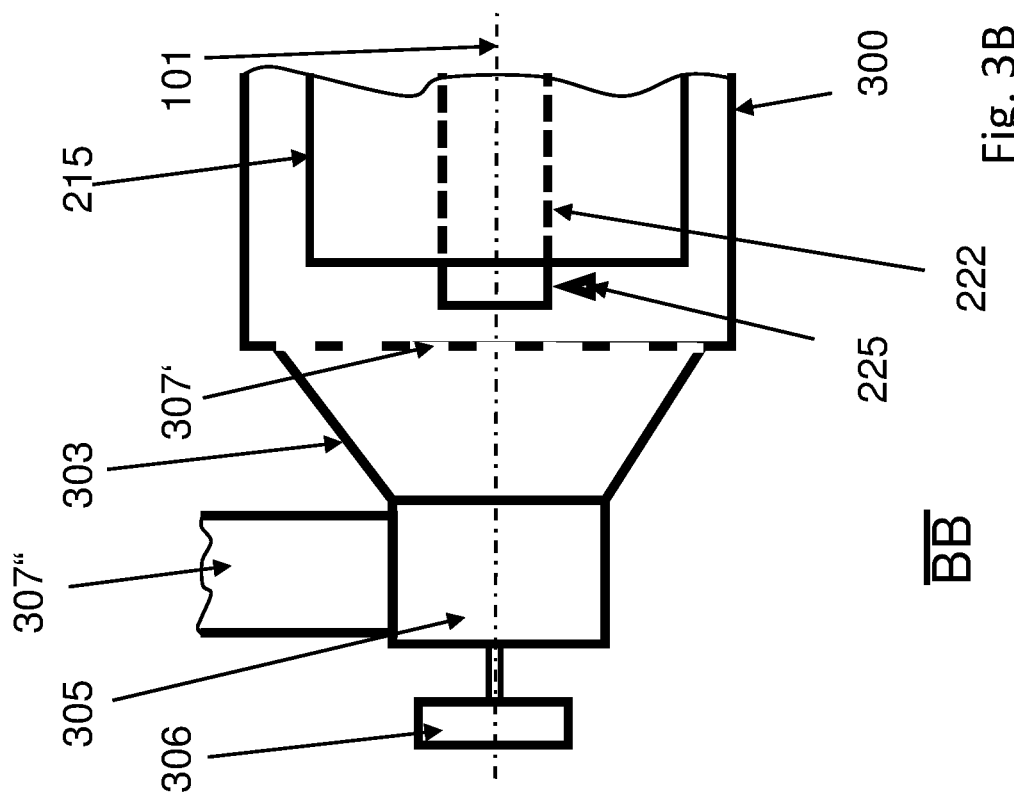
Figure 3A:
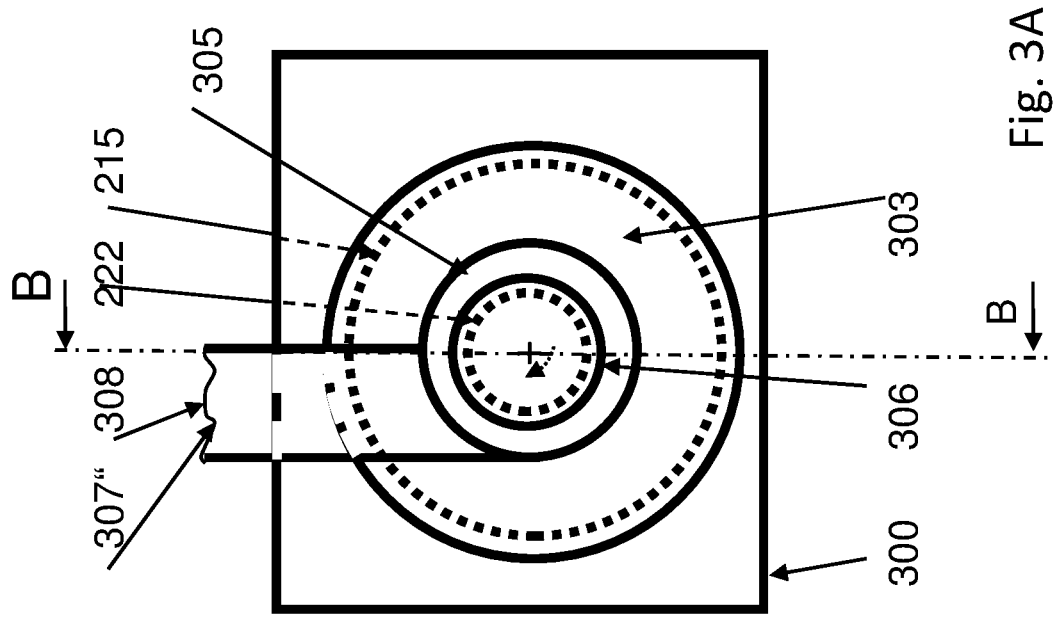

FIGS. 3A and B depict prior art main fan system.

Figures 3C, 3D:
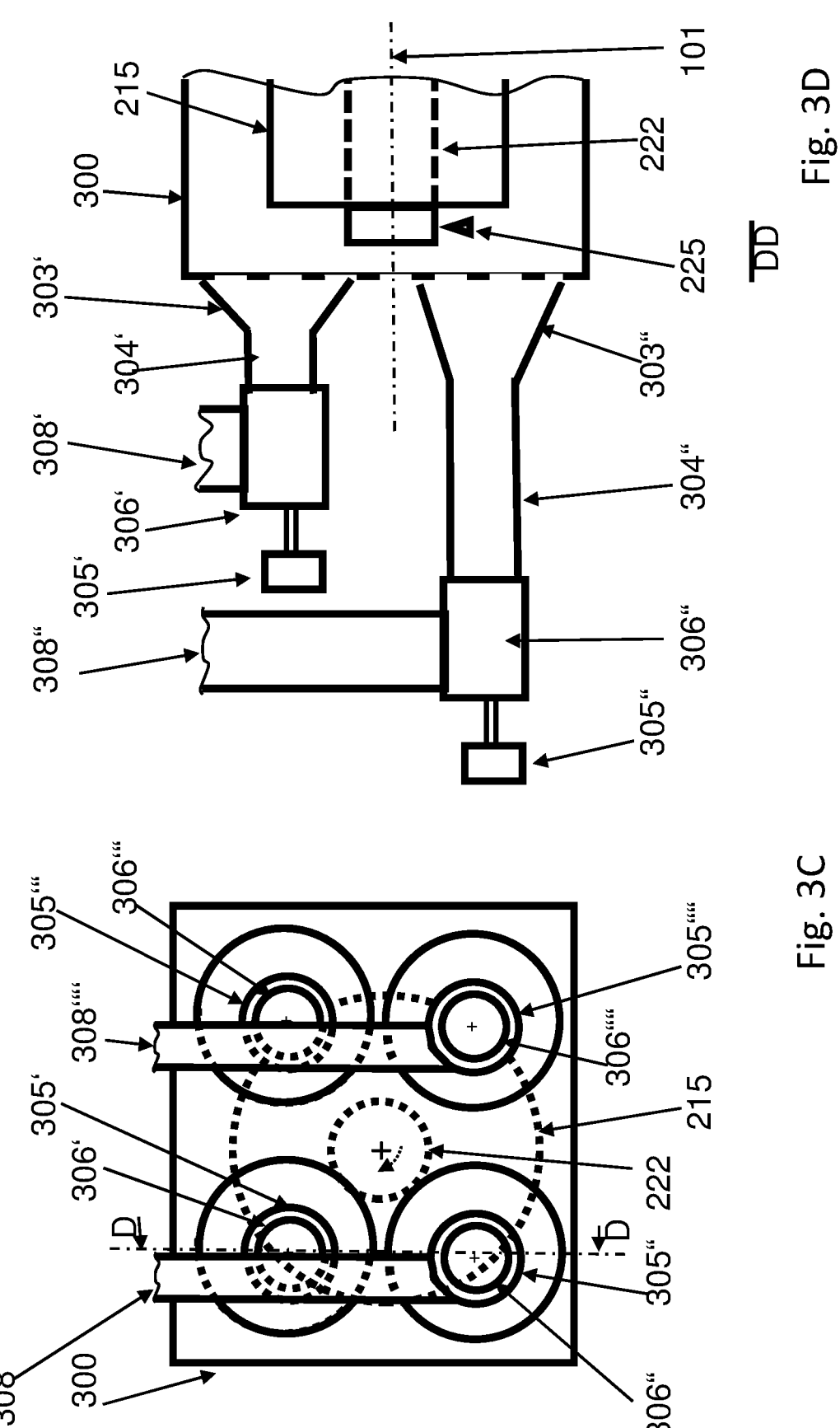

FIGS. 3C and D depict a particularly preferred execution of a main fan system according to the present invention.

Figures 4, 5A:
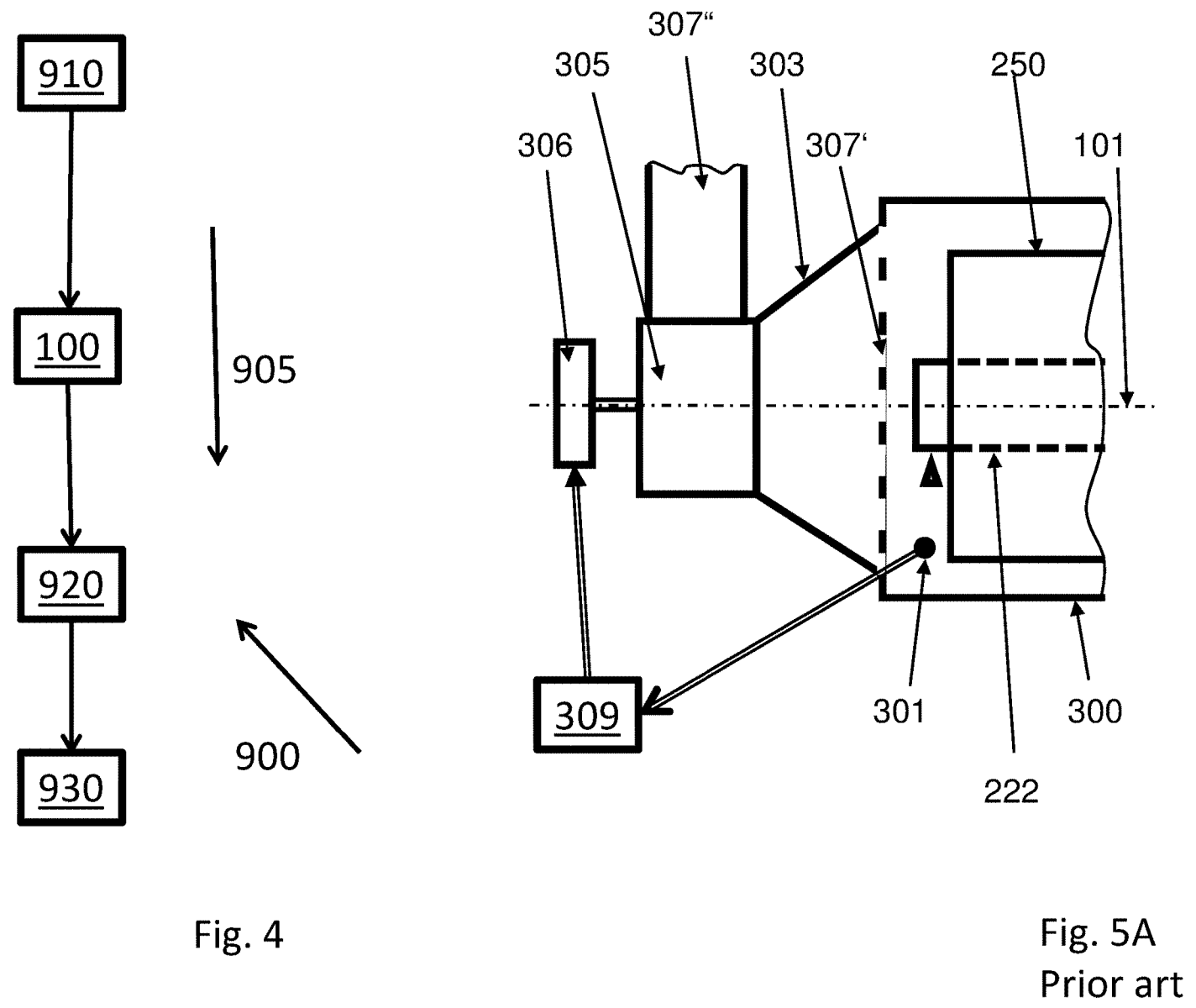

FIG. 4 depicts a process set-up for a filter system comprising a drum filter device according to the present invention.

FIGS. 5A (related art) and 5B show control systems for fan systems.

Same numerals refer to same or equivalent elements or features. Apostrophes (xx', xx") refer to multiple execution of a feature or element, e.g. left-right, upper-lower, which is then to be seen in Cartesian coordinates relative to gravity. Figures are schematically only and not to scale.

DETAILED DESCRIPTION

The present invention is now explained by referring to FIG. 1A to D, depicting the general set-up of drum filter devices for removing particles from a particle loaded stream of air, but which should not be seen in limiting the present invention. A drum filter device 100 operates by suction of particle loaded air 10 from an air inlet 302 through a filter medium 250 that is positioned on the outside of a support drum 200. Thus the particles are deposited on the outside surface there forming a filter cake (not shown) and may be removed by conventional means such as scraper or—as exemplarily indicated in FIG. 1—vacuum nozzles 270, removing the particles in a high particle load air stream 30 through respective outlet 308. The cleaned air 20 is removed from the inside of the drum by a main fan 305 and may be released to the environment through cleaned air outlet 307' or to further processing.

The drum filter device 100 exhibits a length direction 102, defining a front and a rear portion, a height direction 105, defining along gravity an upper and a lower portion, and a width direction 108, as may define a 'left-right' orientation in a cross-sectional view. Generally, a drum filter device 100 comprises the filter media support drum 200, exhibiting a circular cylindrical shape, with filter media 250 positioned on the outside of the air permeable support drum shell 215 of the filter media support drum 200, as may be a apertured metal plate, or a wire mesh. Preferably, the shell is made of circumferentially extending curved sheets, e.g. to allow easier mounting. In an exemplary execution there may be three such sheets, each covering 120° of the shell.

Figure 1A:
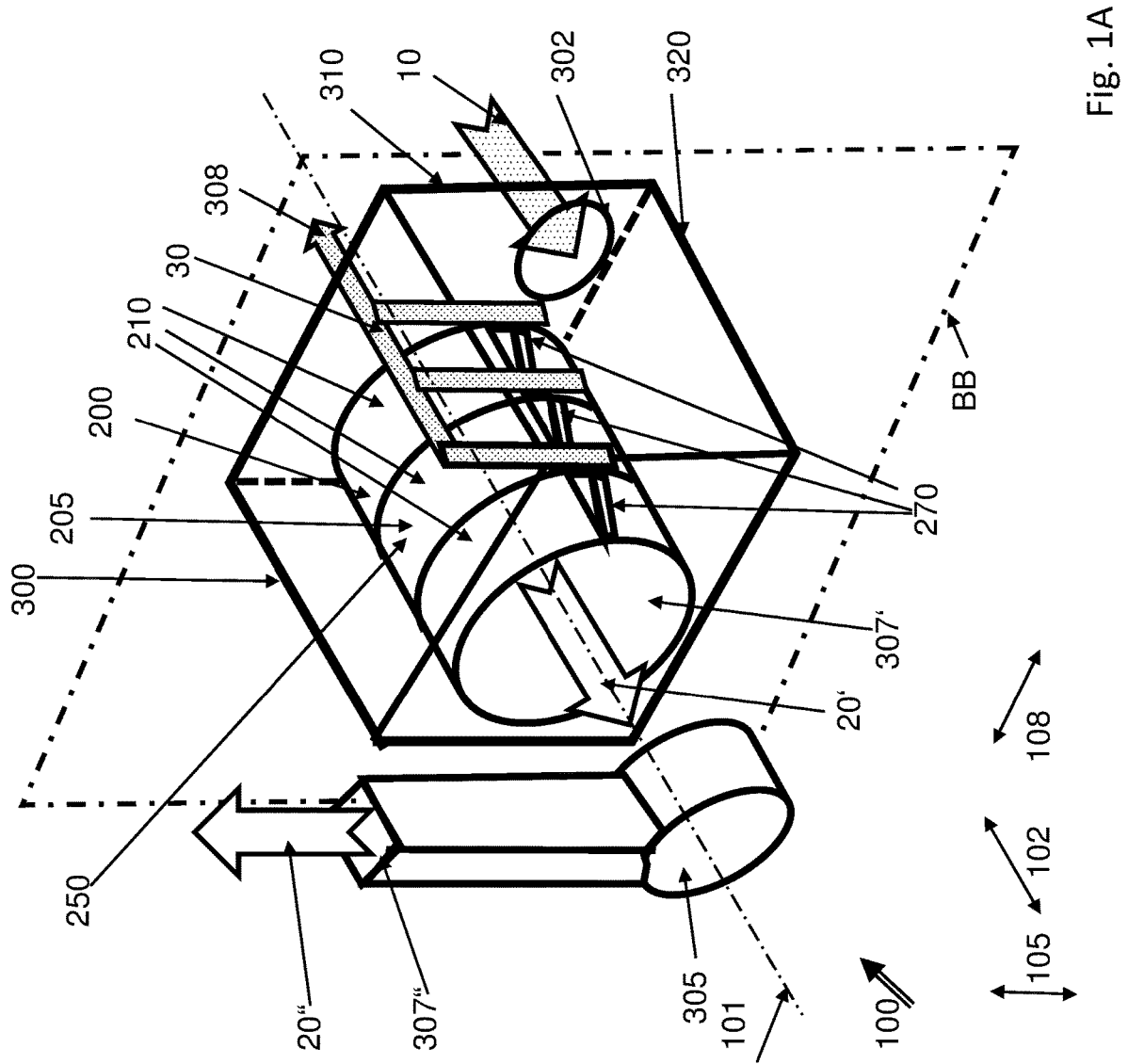
Figure 1B:
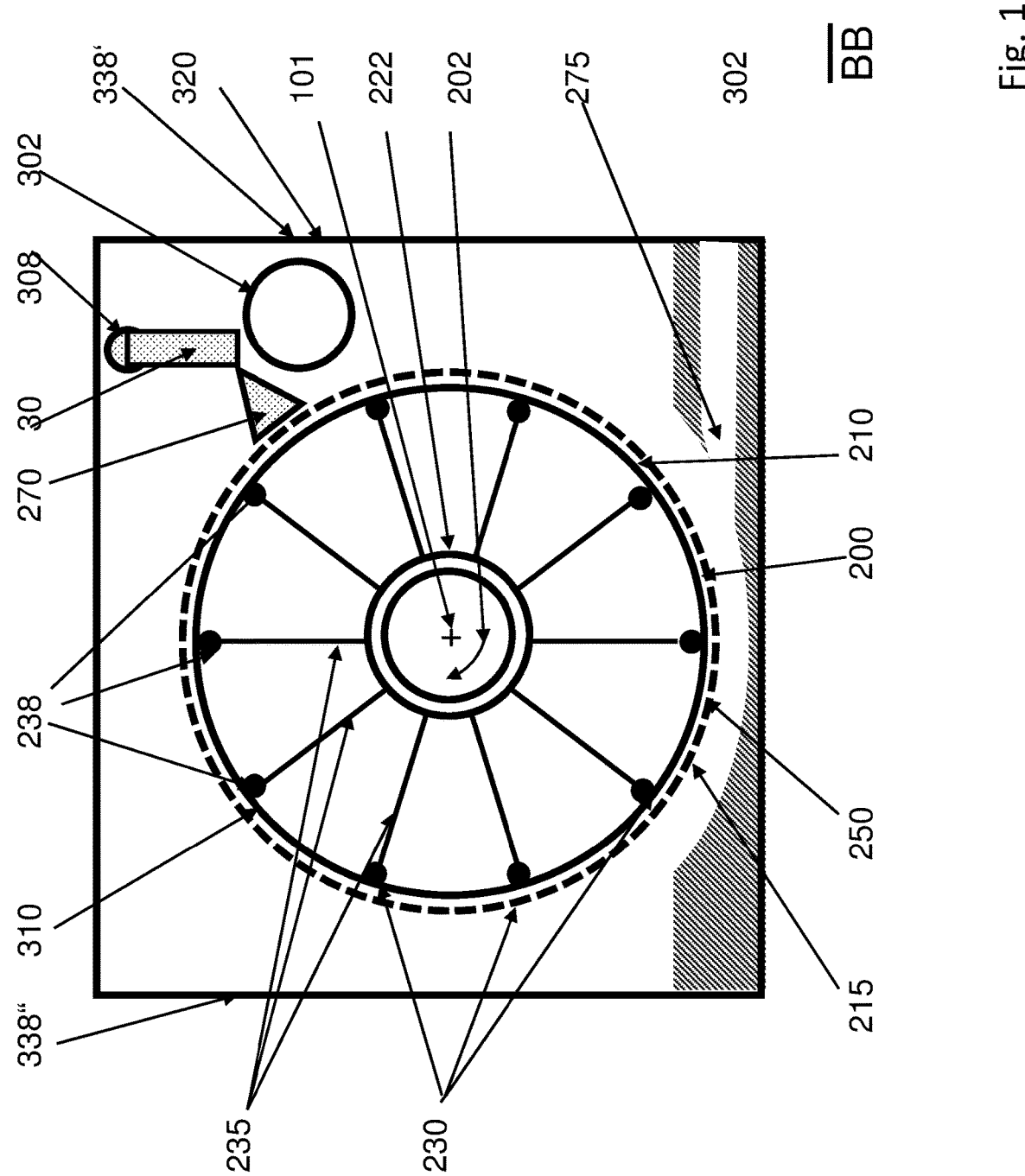

Referring now to FIGS. 1B and C, the support drum shell 215 or its elements, if so executed, are supported by a set of longitudinal spars 230, extending from the front to the rear, and spokes 235, extending outwardly from a drum shaft 222, here exemplarily depicted as a hollow shaft, adapted to rotate around the longitudinal axis 101. Preferably there is a set of at least 4, preferably at least 8, but less than 17, preferably less than 12 longitudinal spars 230. Preferably, there is a corresponding number of spokes 235, and the spokes are connected to the drum shell 215, and preferably to the longitudinal spars 230 at spar connection points 238. In case of a shell having circumferentially extending curved sheets, at least one spoke preferably two or three spokes support each one on the sections. In an exemplary execution there may be nine spokes and correspondingly nine longitudinal spars.

Figure 1C:
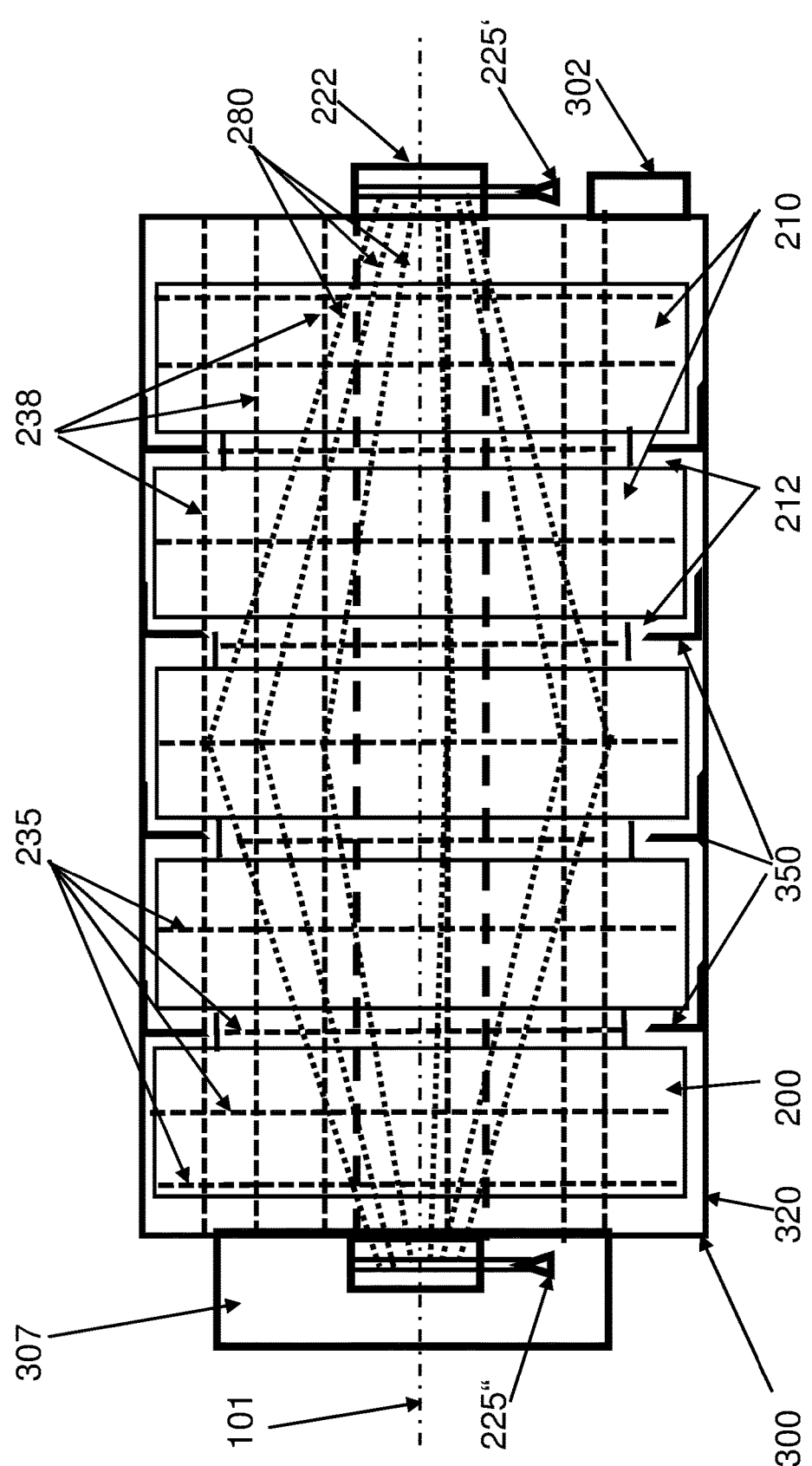

The drum is executed with two or more cylindrical segments 210 co-axially arranged relative to the longitudinal axis 101, such as with three, as shown in FIGS. 1A and C, or with five, as shown in FIG. 1C, but typically less than 20, or less than 10. The segments are separated by grooves 212 and the filter media may be connected to the filter media support structure in these grooves. Each one set of spokes may be connected to the groove region. Optionally, as shown if FIG. 1C, a further set of spokes may be positioned between the grooves 212, preferably midway between these, and each one set of spokes at the front end rear end, respectively. In another exemplary execution as shown in FIGS. 1B and C, a support drum 200 having five segments 210 may comprise 11 sets of spokes and ten longitudinal spars. The drum shaft is supported at its ends by drum shaft supports 225' and 225", such as bearings, and driven by drum shaft motor (not shown) to rotate in the rotational direction 202 around the longitudinal axis 101.

Also indicated in FIGS. 1A and B, a drum filter device further comprises a filter cake removal system, as exemplarily indicated in FIGS. 1A and B as vacuum nozzles 270, that remove the particles that accumulate on the surface of the filter media and transport them in a particle enriched air stream 30 through loaded particle air outlet 308 to a suction and further processing unit (not shown). Alternatively, tapping or scraping systems may be employed. Particles or particle aggregates may also accumulate on the bottom or floor of the housing for further removal, e.g. by a floor cleaning nozzle 275 in FIG. 1B or by a system as described in the above referenced WO'948, to which express reference is made for the particle removing tool.

The drum filter device comprises a housing 300, as separating the inside space from the environment, an air inlet 302 for the particle loaded air 10 and an air outlet 307" for the cleaned, particle depleted air 20. As schematically indicated in FIG. 1A, the drum filter device further comprises a suction device or main fan 305 connected to the clean air outlet of the drum space 307', thereby sucking the particle loaded air to the filter media 250 on the outer surface 205 of the filter media support drum 200 into the inner space of the drum whilst retaining particles on the outer surface of the filter media 250, where they form a filter cake, which can be removed by filter cake removal tool 270 to the particle enriched air outlet 308. The main fan 305 further moves the particle depleted air 20' to a final air outlet 307".

Figure 1D:
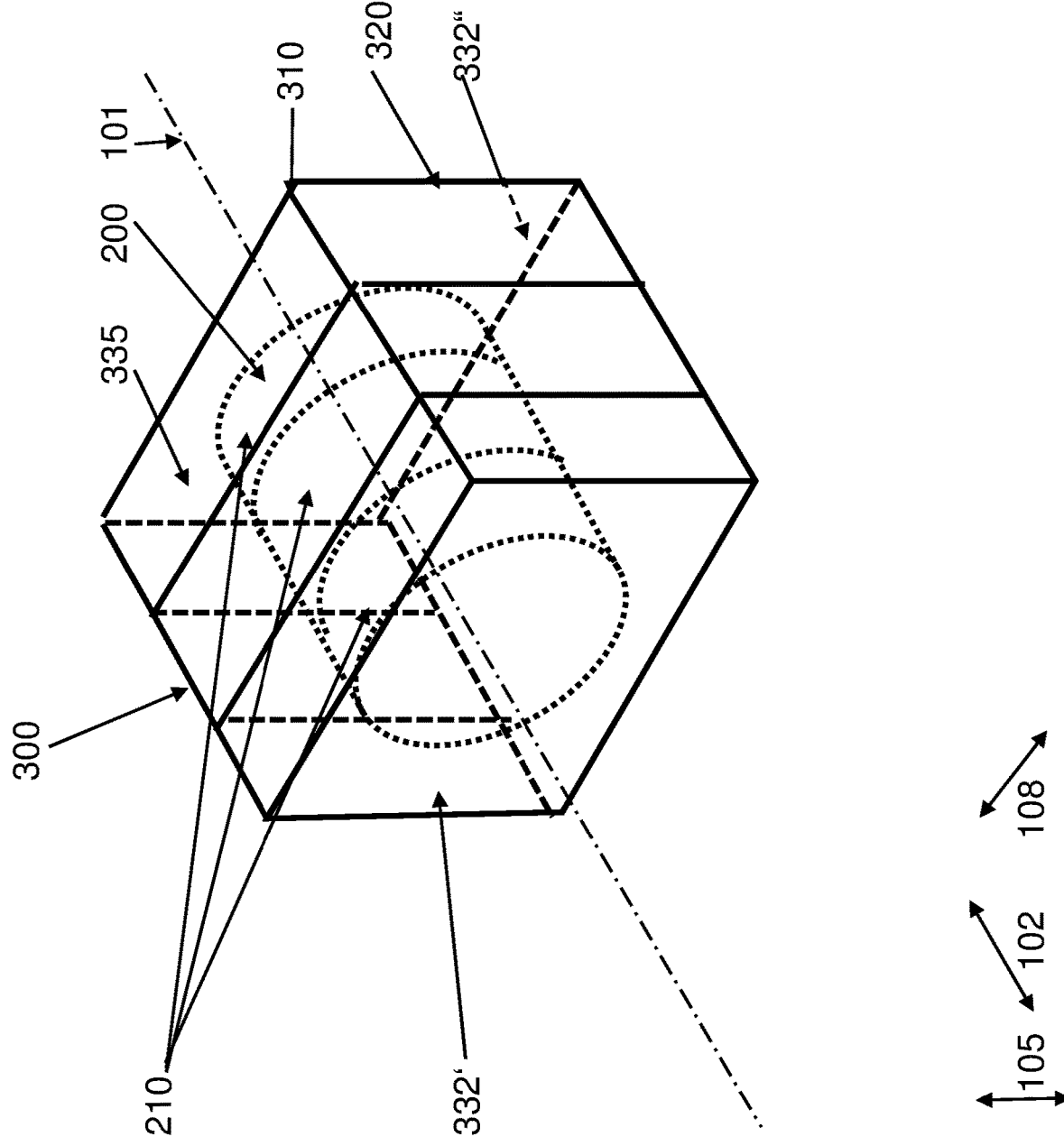

Further, FIG. 1D, depicts generally a housing 300 as omitted in FIG. 1A to C. The filter media support drum 200 with longitudinal center line 101 and drum segments 210 are indicated by dotted lines. The housing 300 comprises a support structure 310, comprising a frame, preferably a generally cuboidal frame 320. The housing comprises a top plates 335, extending along width 108 and length 102, as well as the front and rear closure plates (332', resp. 332"), extending along width 108 and height 105, which may be executed as generally flat structures, optionally corrugated plates, comprising openings for accessories or pipe connections.

In one aspect, the present invention aims at maximizing effective filter area for a given transport size when transferring the drum filter device from its manufacturing site to an operation site.

Figure 2A:
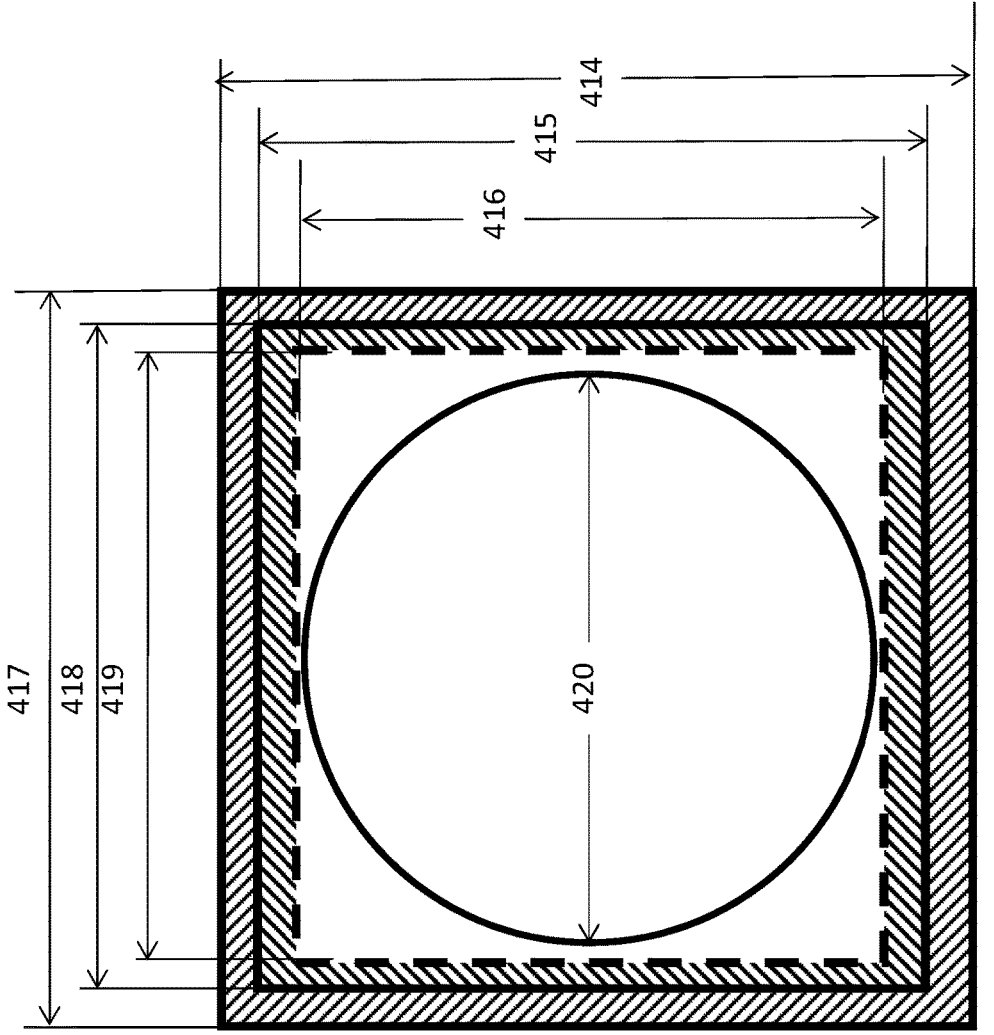
FIG. 2A shows key dimension of a specific ISO container.
Figure 2A:

In order to avoid complicated transport of a drum filter, e.g. by dividing the support drum into separated pieces, or expensive, e.g. oversize, transport of the drum filter to its site of operation, its size is a limiting factor for the drum diameter, which directly impacts on the maximum filter area per length of the drum being limited by dimensions for standard shipment. For this, an ISO container sized transport unit being highly preferred, especially according to ISO 668, type 1AA ("standard 40 ft") container 410 as schematically shown in FIG. 2A, exhibiting an overall outer length of 12.192 m, an outer width 417 of 2.438 m (8 ft), an inner width 418 of 2.352 m, and a door width 419 of 2.343 m, further an outer height 414 of 2.591 m, an inner height 415 of 2.358 m, and a door height 416 of 2.280 m.

Henceforth, when a drum filter device with a maximized filter surface area, and hence drum diameter, is to be transported in such a container, it must not exceed the smaller of the width (419) and height (416) dimensions of the container door opening—in the current case of the ISO 668, 1AA container, not more than 2.280 m. Allowing for a loading clearance of 4 mm each side, the maximum drum diameter should not exceed 2.272 m.

Conventional drum filter designs often have typically diameters not exceeding about 2 m to fit into transport container. Henceforth, such designs exhibit a smaller ratio of the filter surface area to the transport volume per one meter of length of less than about 1.00. The present invention provides drum designs exhibiting such ratios of more than 1.00, or more than about 1.05, or more than about 1.10, or even more than about 1.15.

Further consideration has to be put towards the support structure of the drum during transportation, which preferably is the same as for the operation to avoid complex rearrangement. Referring to FIG. 1C an D again, this can suitably be achieved by a cuboidal frame 320, that also fits through the door opening of the container. Reinforcement ribs 350 of this frame 320 are fitting into the grooves 212 of the filter media support drum 200. Further longitudinal reinforcement ribs of the cuboidal frame can be suitable located in the corners of the container space. Preferably, the reinforcement ribs exhibit a radial extension of more than 5 mm, or more than 20 mm, but typically less than 200 mm, and a thickness along the longitudinal direction 102 or more than about 20 mm, or more than about 50 mm, but less than about 200 mm, or less than about 100 mm. Grooves 212 between the segments 210 need to allow these reinforcement ribs to fit in, but also allow for space for fixation tools for the filter media, and exhibit preferably a width along the longitudinal direction 102 of less than about 200 mm, preferably less than about 150 mm, but typically more than about 50 mm, and a radially extending depth of less than about 200 mm, or less than about 100 mm, but more than about 20 mm. Preferably, the filter media is connected to the filter media support by an air tight drum seal.

Whilst such a structure can easily be transported from the manufacturing site to the operation site, it does as such not allow for sufficient space surrounding the filter media support drum to ensure good air flow around the drum as desired to allow uniform air flow through the filter media. Such an air flow space may be in an annular shape, with the annulus size being approximately at least 10 cm, preferably more than 20 cm, more preferably about 40 cm or even more. Considering that air is removed through the filter media the air flow along the rotational direction 202 of the drum 200 the space for the air flow may be reduced from the air inlet towards the filter cake removal tool.

In order to reach such dimensions, the present invention provides for removable side portions 338 of the filter housing 300 and a floor skid 450, that can be readily transported in a separate container together with other auxiliary equipment, like connectors, filter cake removal items, or air fans.

Figure 2B:
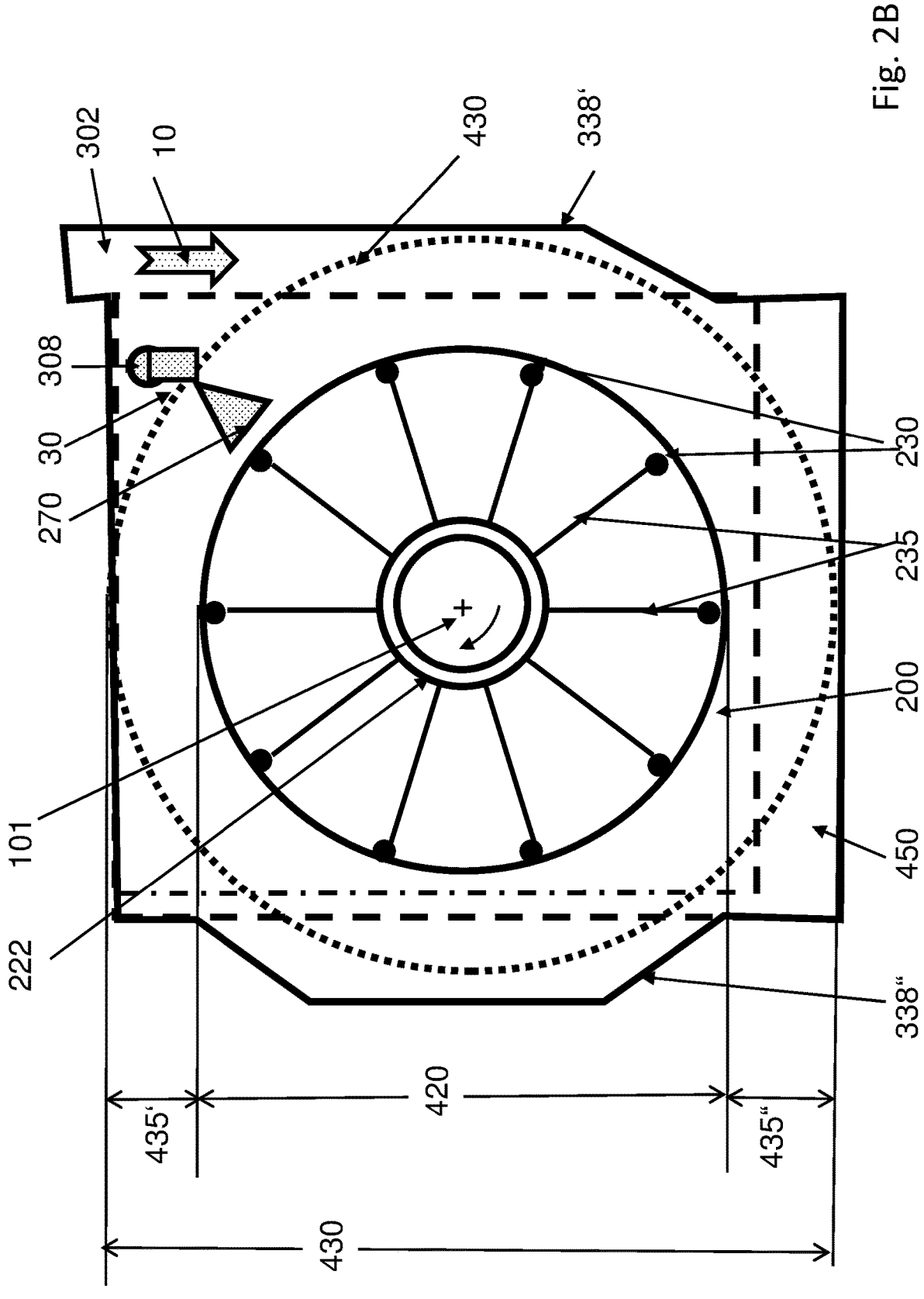
FIG. 2B to 2F depict various executions for drum filters according to the present invention adapted to be readily transported in such a container.

Referring now to FIG. 2B, the door opening width (419) and height (416) dimensions circumscribe with a small tolerance allowing for handling the diameter 420 of the filter media support drum 200, here shown with the drum shaft 222, drum shell 215, and spokes 235, but with filter media omitted. Further shown as a dashed circle is the outer circumference 430 of the air space around the drum. As can be seen, the size extension by the floor skid 450 provides good air flow space underneath the drum. The floor skid may exhibit a height of at more than cm, or more than about 20 cm or more than about 40 cm, but typically will be less than about 1 m, with its width matching about the cuboidal frame and the length not exceeding the container length.

Preferably, a floor cleaning nozzle 275 is positioned in the vicinity of the lowermost point of the space underneath the drum to remove particles or particle aggregates that may drop from the filter media or deposit otherwise. The floor cleaning nozzle should be adapted to provide a balance of air flow volume and air flow speed so as provide an air speed along the flow direction in the nozzle opening, preferably being more than about 10 m/sec, or more than about 15 m/sec, but less than about 25 m/sec, or less than about 20 m/sec, exemplarily about 18 m/sec.

Figure 2C:
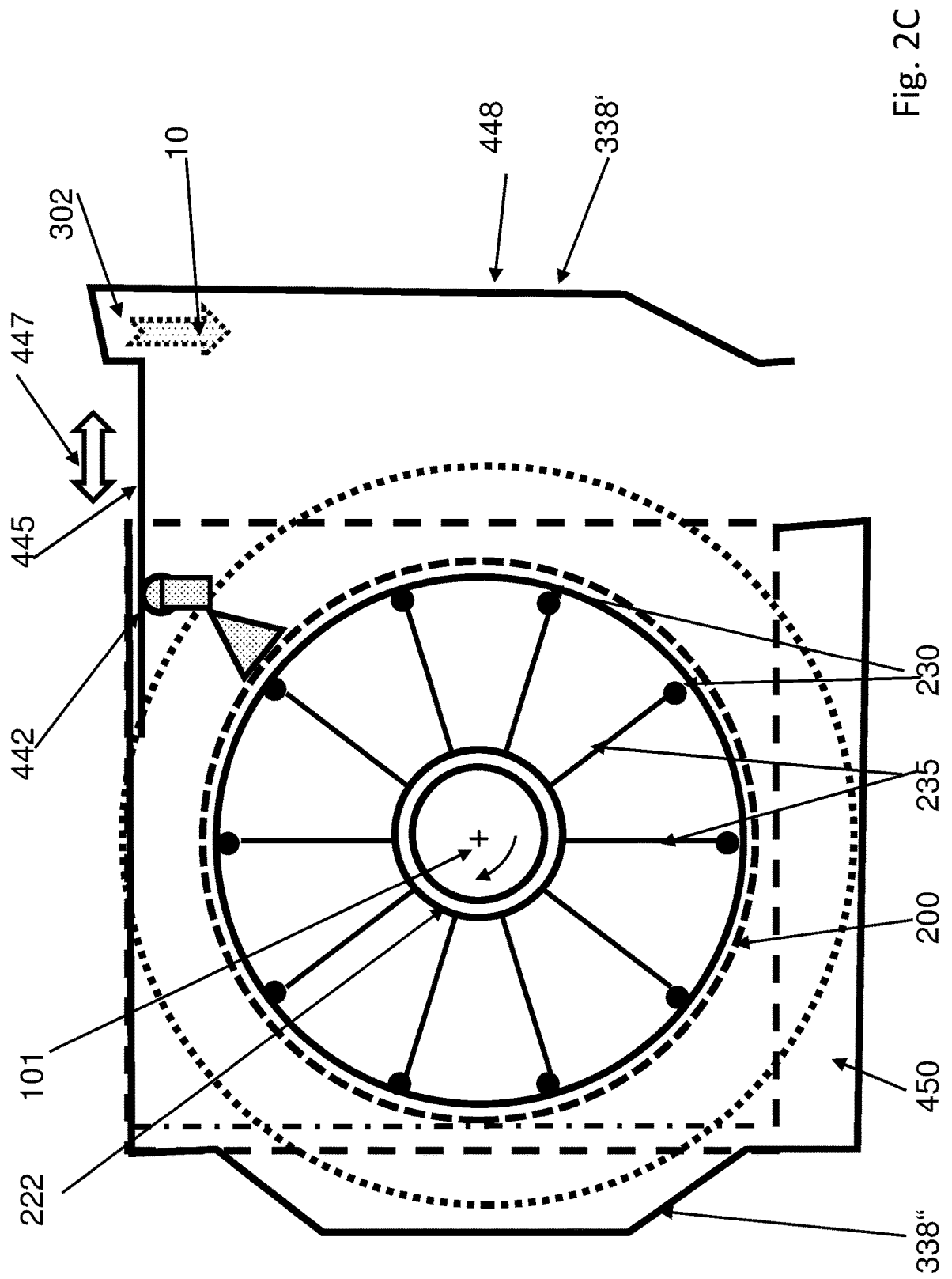
Figure 2D:
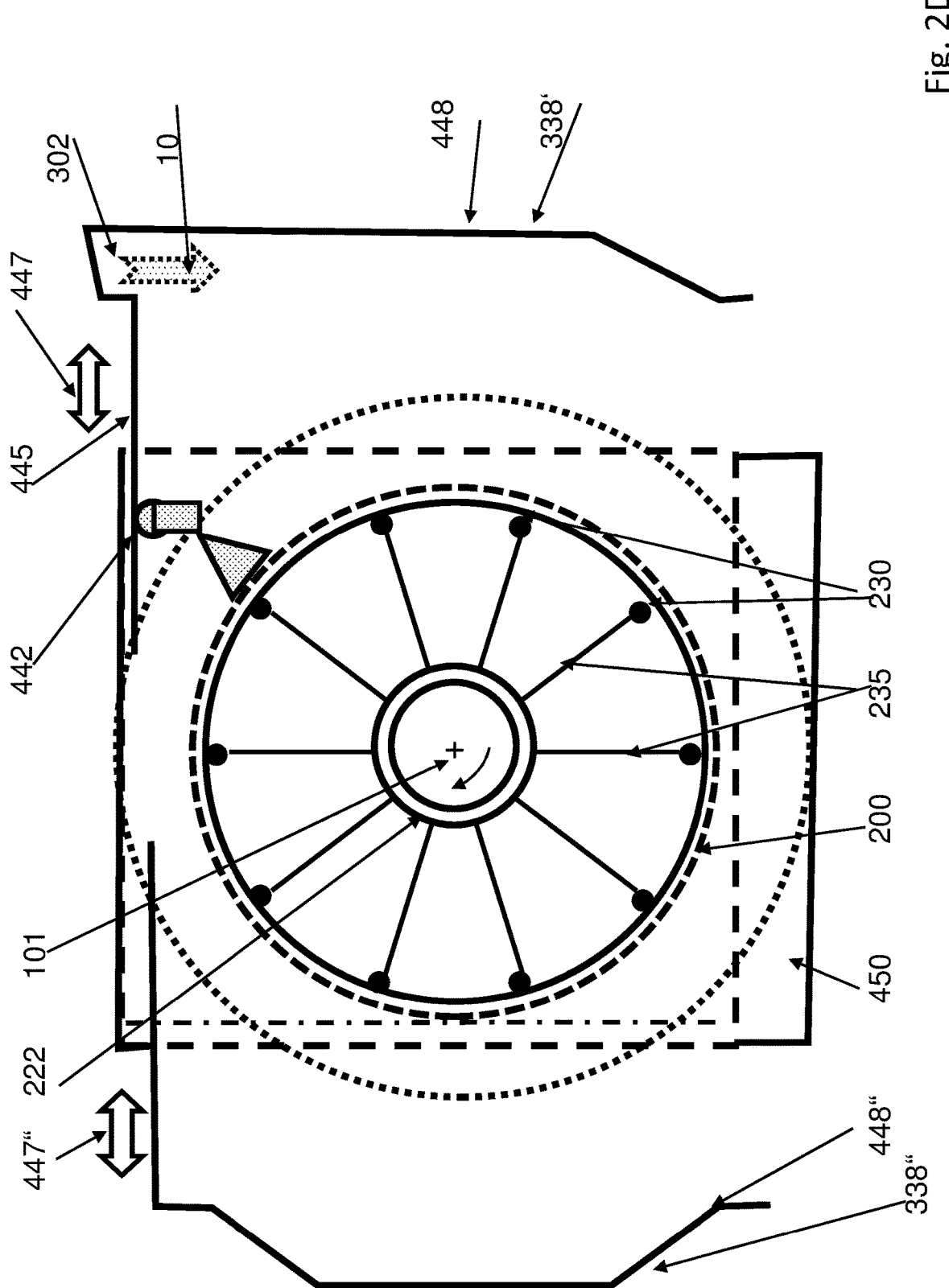
Figure 2E:
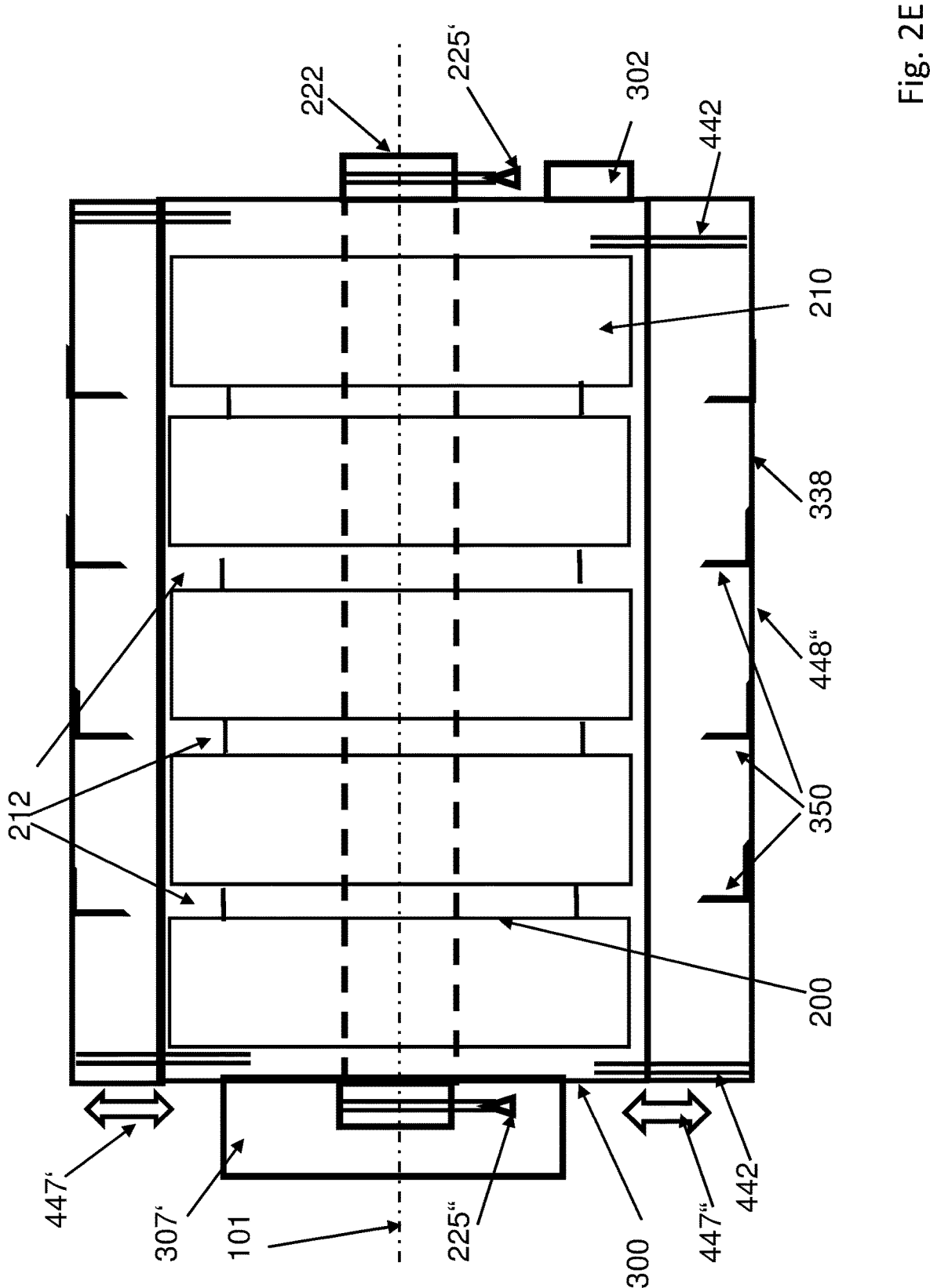

The side walls 338' and 338" are preferably executed in a bulged shape, and at least for the transport removable. Preferably one, more preferably both of the side walls 338' and 338" are executed such that they can be opened on the operation site and allow easy access to the inside of the drum filter device. Whilst this can be executed in various ways, preferably it is designed as doors that can be opened around horizontal or lateral hinges, but preferably the doors can be laterally slid, most preferably away from the drum, i.e. perpendicularly to the drum axis. Even more preferably for allowing good access, the doors 448' and 448" are suspended from arms 445' and 445" which are laterally moveable along direction 447 by a sliding mechanism 442, as indicated in FIGS. 2C and D. FIG. 2E corresponds to FIG. 1C, but additionally includes the movable doors.

Also indicated in FIG. 2B is the positioning of the particle loaded air inlet 302 and the filter cake removal tool, e.g. a nozzle 270. This positioning allows to have the size of the space for the air flow around the drum not executed as an annulus with a constant size (as indicated by circle 430 in FIG. 2B), but may be reduced from the region of the air inlet towards the filter cake removal tool, as the air flow is already reduced to the suction through the filter media (not shown) on the filter media support drum. Thus, the bulge of the side walls may be adapted to the air flow, and may be executed in a symmetric or asymmetric rounded shape, or, as indicated in FIG. 2C, by a trapezoidal shape, though triangular, rectangular or otherwise shaped side wall may provide an equivalent solution.

Considering that the filter housing 300 has to withstand some under-pressure, a housing wall thickness and housing frame 320 reduce the available space for the drum filter. Further, the particle loaded air flow has to reach a sufficient portion of the surface of the filter media on the outside of the drum to allow most efficient operation.

Henceforth another aspect of the present invention is an execution of the side walls 338 with reinforcement ribs 350 to allow better structural strength with regard to the vacuum within the drum filter device. These reinforcement ribs 350 preferably extend inwardly, and are adapted to fit into connection grooves 212 between the drum segments 210, thus not protruding laterally beyond the drum.

Thus, in order to maintain the overall large diameter of the filter media support drum 200, this is constructed in cylindrical segments 210, at least two, preferably at least four, but preferably less than ten. These segments 210 exhibit the maximum possible diameter to fit into the housing frame 320 and are separated by grooves 212. The number, spacing and size of the grooves is adapted to allow the reinforcement ribs 350 to fit in.

Optionally, connection points 238 of the generally spokes 235 and the longitudinal spars 230 may be positioned also in the region of the grooves 212.

Independent from allowing lower weight side walls 338, the segmented filter media support drum also allows to fit segmented filter media 250 thereon. This approach allows much easier handling of the filter media, e.g. for fitting, inspection, repair, or replacement. The fixation of the media can be standard seal, such as known under the trade designation "Guardian Seal Unit" by Osprey Corp., USA, the principle of which is exemplarily depicted in FIG. 2G, showing filter housing surface 300 with seal support surface 535. Further, filter media 250 rests on filter media support drum 200 and extends outwardly towards the housing, overlying a first (510) and a second (520) circumferential seal, which are abutting a seal stop 545 and extend towards the housing 300. The first seal 510 remains essentially flat along the axial direction and is hold in place by a circumferential elastic retainer 515. The second seal 520 is bent upwardly so as to contact the filter housing surface 530. A circumferential seal retainer holding band 550 fixes the a first and second seal as well as the filter media outwardly towards the filter housing adjacent to the seal stop 545 such that the first and the second seal slide on the surfaces 530 and 535 of the stationary housing.

Figure 2F:
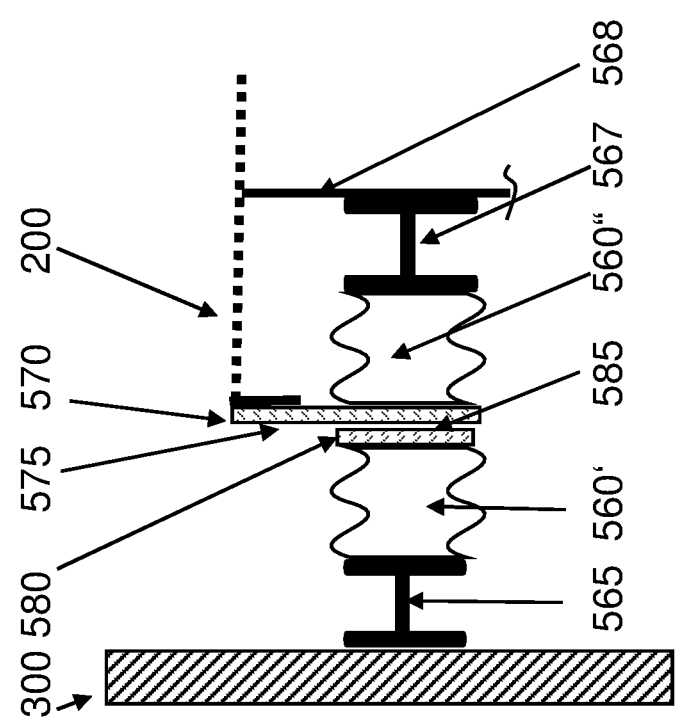
Figure 2G:
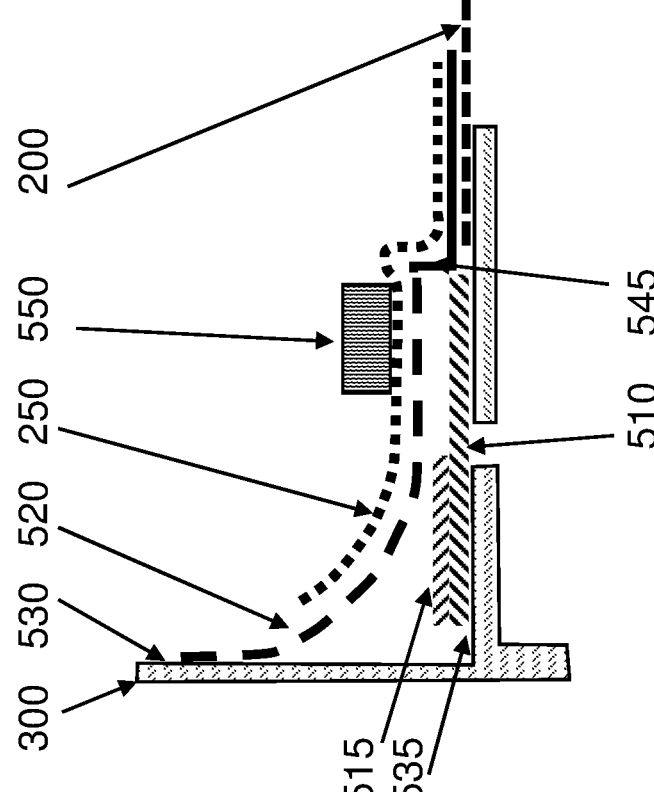
FIG. 2G is a related art system.

A particularly preferred alternative is explained by referring to FIG. 2F. A circumferential first sealing element 570 with a first sealing surface 575 is connected to the rotating filter media support drum 200 with the filter media by a first fixation member 567, as may further be connected to other support structures of the filter media support drum, here generally indicated by further support 568. A second stationary circumferential sealing element 580 with a second dealing surface 557 is connected by fixation member 565 to the housing 300. The two sealing surfaces 575 and 585 are pressed against each other by respective air pressurized bellows 560' and 560", respectively, positioned between the sealing member and their support member. At least the surfaces of the sealing members are preferably executed as low friction surfaces, preferably a coefficient of friction of less than about 0.3, or less than about 0.2, or even less than 0.1. In a particular execution, the first surface 570 is made from low friction materials, such as PTFE or similar. Preferably, the material exhibits a moderate hardness, such as less than about $5.8 \ 10^7$ Pa, when measured according to the Vickers method, or more than about $7.0 \ 10^6$ Pa. Preferably, the second, stationary surface 580 is also exhibits a low coefficient of friction od less than about 0.3, or less than about 0.2, or even less than 0.1. Preferably, one of the surfaces, preferably the stationary one 580, exhibits a higher hardness than the other, preferably exhibiting a difference of more than about 5%, or more than about 10%, or more than about 15%, relative to the lower hardness material.

In another aspect, the present invention aims at easing transport by minimizing weight as well as minimizing material usage, and hence resource consumption. As shown in FIG. 1C, torsional tensioners 280 may be applied to connect the drum shaft 222 end points in proximity to its support points 225, e.g. bearings, with outer endpoints positioned at the spar connection points 238. Whilst, torsional tensioners may be connected to several segments, it often is sufficient and for simplicity preferred that these are connected to a set of spokes positioned midway between the shaft support points 225. Surprisingly, it has been found that such a construction can significantly reduce the catenary sag of the shaft, which otherwise may put excessive strain to the rest of the structure.

In an exemplary design of a support drum 200 with five cylindrical equally sized support drum segments 210, separated by four grooves 212 and each having a further set of spokes 235, stainless steel torsional tensioners 280 were tautened between the shaft support points 225 and the centrally positioned connection points 238'. The shaft was a hollow shaft made of stainless steel, the sagging was determined to up to about 8 mm during operation without application of the tensioners, but only 1.25 mm with such tensioners.

In another aspect for reducing energy consumption in an easy to transport design, the present invention provides an improved design for the main fan system. Such a conventional system, as depicted in FIG. 1A and further in a view along the longitudinal axis in FIG. 3A and perpendicularly thereto in FIG. 3B comprises a single main fan connected via a straight duct with the cubical housing of the filter. However, this is disadvantageous from an air flow point of view as it induces significant turbulence in the air, reducing the energy of the system. Thus it is preferred to include one or more of the features as described in the context of FIGS. 3C and D. In a first approach, the large main fan 305 is replaced by more than one, preferably four smaller man fans 305' to 305"". In a second approach, the duct work is executed as transition sections 303, tapering from a larger cross-section where they are connected to the filter housing towards the main fans, and even further including as a third approach an air flow settling section 304 to even the airflow before reaching the fan. Preferably, the connection openings between filter housing and tapering section of all smaller main fans cover the full front area of the filter. Preferably, the tapering section reduce the cross-sectional area from a rectangular opening in the filter housing to a circular cross-section transitioning to the air flow settling section with an essentially constant cross-section. Preferably, the air flow settling section exhibits a length of at least 1.5 times the respective diameter. In a fourth approach, the main fans are off-set relative to the longitudinal axis of the filter drum, thus allowing a compact modular design, also for easy transportation.

Whilst it is often accepted that a larger fan is more energy efficient than two or more smaller ones, especially the setup with four fans, and more especially including the tapering and settling sections may require less than 90%, often less than 85% of the energy of a comparable single fan with equivalent air flow volume and pressure drop. Further, such a system provides a significant improvement in the overall operational reliability, as in case of failure of one of the fans there are still the other ones operational, and in particular if designed with a certain surplus of speed potential compared to the normal operational speed, only a very limited impact of the failure occurs.

In yet a further aspect, the present invention is a rotary drum filter with minimized weight and maximised manufacturing simplicity. To this end, the drum filter support drum as well as the housing comprise preferably more than about 70 w-%, preferably more than about 80 w-% and even more preferably more than about 90 w-% low weight, high strength, but low weight material, such as aluminium or aluminium alloys. Preferably the materials are not welded, but assembled from prefabricated elements, preferably bolted together, allowing high precision at quick and easy assembly.

In yet a further aspect the present invention as depicted in FIG. 4 is a filter system 900 comprising at least a drum filter device 100, preferably of the high filtering area to shipping size type as described herein above. The filtering system may further comprise pre-filter 910, positioned before the drum filter in the process direction 902, corresponding to the general direction of flow of air. also referred to as "upstream". Pre-filters as such are well known in the art, a particularly preferred execution is a cyclone for separating coarse particles.

The filtering system may also or alternatively comprise an active filter 920 positioned downstream of the drum filter. Within the present context, active filters are considered filters that comprise stationary filter media, preferably bag filters, that are combined with cleaning tools for removing automatically, i.e. without human intervention, accumulated particles from its media. Such filters are known as such, and comprise vibrating or tapping systems.

The filtering system may also or alternatively comprise a passive filter positioned downstream of the drum filter and the active filter, if present.

In a preferred execution, the filter system 900 comprises a drum filter device 100, preferably of the execution as described herein above, which is particularly adapted to filter out large amounts of particles at a low pressure drop/energy requirement. Also, it allows easy collecting of the filtered particles.

an active filter 920, which is particularly adapted to retain finer particles at a higher pressure drop and energy requirement, whereby the automatic cleaning system still allows to process moderate particle loadings in the air.

and a passive filter 930, which is particularly adapted to retain the smallest particles, at lower particle loads, and may be executed as a high efficiency filter, often referred to as HEPA filter.

This set up provides particular benefits, as it balances the advantages of each of the three element.

Figure 5B:
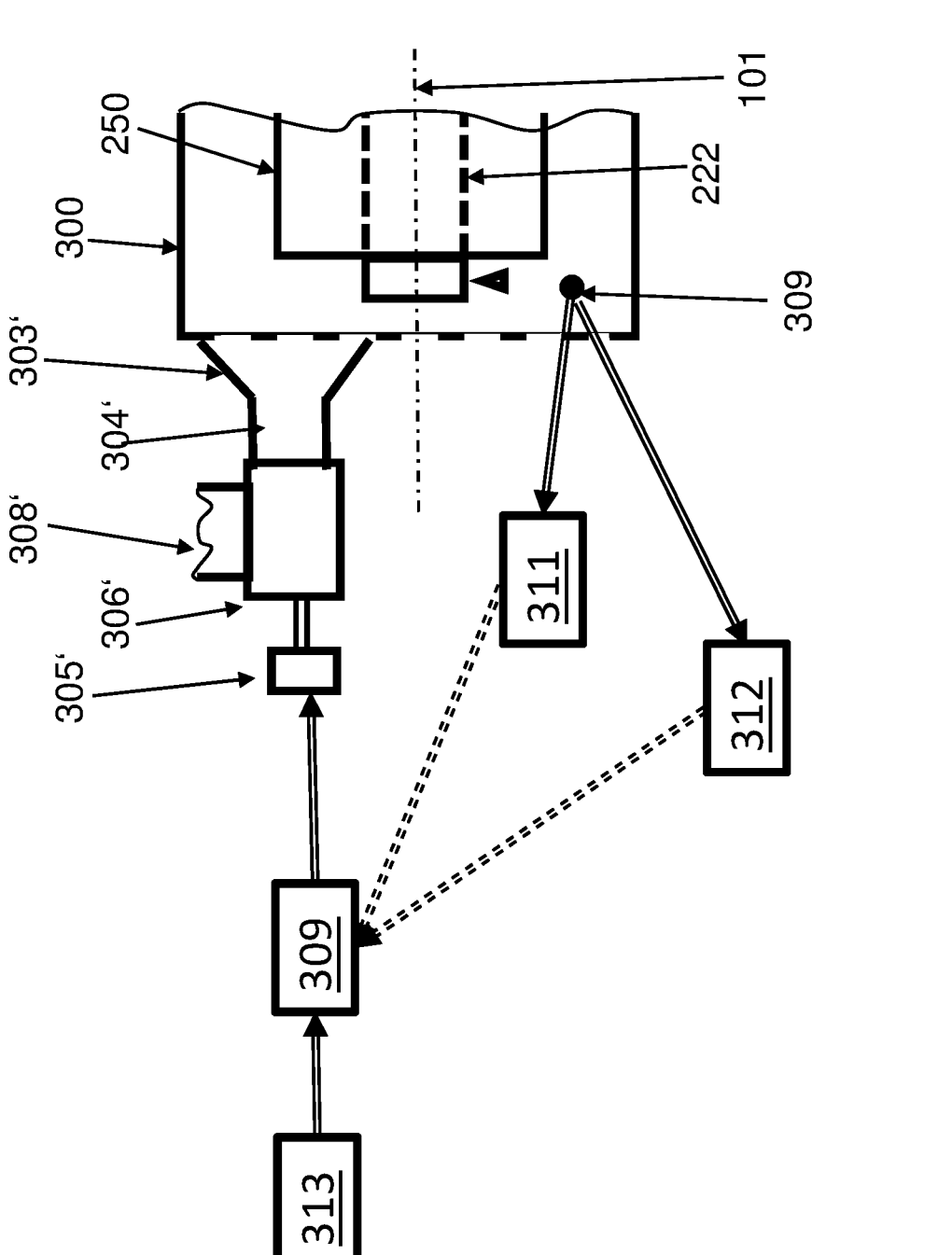

The present invention may include a conventional control system for the speed of the main fan or main fans. Referring to FIG. 5A, which is based on FIG. 3B, such a system may comprise a pressure sensor 301 positioned inside the drum housing 300, but outside the rotary drum with the filter media 250, which is connected to a control unit 309 which is configured to receive input from the pressure sensor and transform it into a speed control signal of the main fan drive 306, such as described in U.S. Pat. No. 8,597,391B1. However, such a system may result in unsatisfactory control, e.g. in case of a blockage of cleaning nozzles. Thus, in FIG. 5B showing an extract of a single main fan as otherwise depicted in FIG. 3D, a preferred execution for a main fan drive speed control is explained that is independent from the pressure sensor other than for emergency shut off 311 or for alerting operators that then may manually adjust the speed control signal via a human interface device 312. For the normal operation, the initial pressure drop (delta p {zero}) across the filter media 250 is determined according to the media properties of the media as installed and stored in a data storage system 313 as well as a corresponding curve for the pressure differential increase over time based on the expected life time of the filter media. In an exemplary execution a fresh filter media may an initial pressure drop as a material property and the fan or fans operate at an initial speed. In order to compensate for the filter media aging effect, the fan speed is set to increase by a preset incremental speed increase, e.g. 1 rpm per month, or 0.1% per month. Thus, both the main fan drive speed but also filter media maintenance and replacement occur according to a preset schedule rather than potentially misleading pressure drop-fan speed control loop.

The invention claimed is:

1. A rotary drum filter device for filtering particle loaded air, said drum filter device
   comprising
   a housing,
      comprising
         reinforcement ribs,
         closure plates,
         access doors,
         particle loaded air inlet,
         clean air outlet
         particle enriched air outlet, connected to a particle enriched air suction device;
   a filter media support drum
      rotatably mounted around a drum axis,
      comprising at least two filter media support segments
         said filter media support segments forming drum segments that are co-axially mounted on said drum axis,
      filter media segments,
         each one being positioned outwardly of and covering a segment of said filter media support segments,
         adapted to be removably connected to said filter media support segments;
   at least one main fan connected to said clean air outlet of said housing;
   wherein
      said filter media support drum further comprises grooves between each two filter media support segments,
      and in that said reinforcement ribs fit into the connection grooves of said filter media support drum.

2. A rotary drum filter device according to claim 1,
   further comprising at least one element selected from the group consisting of
      at least one of said access door of said housing is adapted to be translatorily slid from a closed to an open configuration by means of support arms,
      said housing is adapted to fit into the size and through the door of an ISO 668 type 1AA-container,
      wherein a support skid, side portions and main fan system(s) are adapted to be removable for transport;
      a speed control system for controlling the speed of the one or more main drive fan(s), comprising
      a data storage system comprising a pre-set drive fan speed versus time correlation, adapted for a virgin filter media;
      a main fan drive speed control unit adapted to adjust the main fan drive speed according to said pre-set correlation,
      a drum seal system comprising a first surface and a second sealing surface, wherein one of said surfaces is connected to said housing, and wherein the other of said surfaces is connected to said rotatably mounted filter media support drum,
   wherein said surfaces are pressed against each other by air pressure bellows.

3. A filter system, comprising
   a rotary drum filter device according to claim 1,
   further comprising
   an active filter downstream of said drum filter device;
   and optionally a passive filter device positioned downstream of said active filter device and upstream of said main fan system.

4. A rotary drum filter device for filtering particle loaded air, said drum filter device
   comprising
   a housing,
      comprising
         reinforcement ribs,
         closure plates,
         access doors
         particle loaded air inlet,
         clean air outlet
         particle enriched air outlet, connected to a particle enriched air suction device;
   a filter media support drum
      rotatably mounted around a drum axis,
      comprising at least two filter media support segments
      said filter media support segments forming drum segments that are co-axially mounted on said drum axis,
      filter media segments,
         each one being positioned outwardly of and covering a segment of said filter media support segments,
         adapted to be removably connected to said filter media support segments;
   at least one main fan connected to said clean air outlet of said housing;
   wherein
      said drum axis comprises support bearings;
      said drum segments comprise spokes,
   characterized in that
      said drum air filter device further comprises torsional tensioners
         extending from said support bearings to outwardly positioned tensioning points of said spokes of said drum segments.

5. A rotary drum filter device according to claim 4,
   further comprising at least one element selected from the group consisting of
      at least one of said access door of said housing is adapted to be translatorily slid from a closed to an open configuration by means of support arms,
      said housing is adapted to fit into the size and through the door of an ISO 668 type 1AA container,
      wherein a support skid, side portions and main fan system(s) are adapted to be removable for transport;
      a speed control system for controlling the speed of the one or more main drive fan(s), comprising
      a data storage system comprising a pre-set drive fan speed versus time correlation, adapted for a virgin filter media;
      a main fan drive speed control unit adapted to adjust the main fan drive speed according to said pre-set correlation,
      a drum seal system comprising a first surface and a second sealing surface, wherein one of said surfaces is connected to said housing, and wherein the other of said surfaces is connected to said rotatably mounted filter media support drum,
   wherein said surfaces are pressed against each other by air pressure bellows.

6. A rotary drum filter device according to claim 4, wherein said drum segments comprise spokes positioned longitudinally centred in each of said drum segments.

7. A rotary drum filter device according to claim 4, wherein
      said drum air filter device further comprises torsional tensioners

13 extending from said support bearings to outwardly positioned tensioning points of said spokes of said drum segments to each of said circumferential support spars of said drum segments.

8. A filter system, comprising
a rotary drum filter device according to claim 4,
further comprising
an active filter downstream of said drum filter device;
and optionally a passive filter device positioned downstream of said active filter device and upstream of said main fan system.

9. A rotary drum filter device for filtering particle loaded air, said drum filter device
comprising
a housing,
comprising
reinforcement ribs,
closure plates,
access doors
particle loaded air inlet,
clean air outlet
particle enriched air outlet, connected to a particle enriched air suction device;
a filter media support drum
rotatably mounted around a drum axis,
comprising at least two filter media support segments
said filter media support segments forming drum segments that are co-axially mounted on said drum axis,
filter media segments,
each one being positioned outwardly of and covering a segment of said filter media support segments,
adapted to be removably connected to said filter media support segments;
at least one main fan connected to said clean air outlet of said housing;
wherein
said drum segments comprise radial and longitudinal support spars,

and in that at least said drum segments and support spars are manufactured from lightweight materials.

10. A rotary drum filter device according to claim 9,
further comprising at least one element selected from the group consisting of
at least one of said access door of said housing is adapted to be translatorily slid from a closed to an open configuration by means of support arms,
said housing is adapted to fit into the size and through the door of an ISO 668 type 1AA container,
wherein a support skid, side portions and main fan system(s) are adapted to be removable for transport;
a speed control system for controlling the speed of the one or more main drive fan(s), comprising
a data storage system comprising a pre-set drive fan speed versus time correlation, adapted for a virgin filter media;
a main fan drive speed control unit adapted to adjust the main fan drive speed according to said pre-set correlation,
a drum seal system comprising a first surface and a second sealing surface, wherein one of said surfaces is connected to said housing, and wherein the other of said surfaces is connected to said rotatably mounted filter media support drum,
wherein said surfaces are pressed against each other by air pressure bellows.

11. A rotary drum filter device according to claim 9, wherein
at least said drum segments and support spars are manufactured from aluminium or aluminium alloys.

12. A filter system, comprising
a rotary drum filter device according to claim 9,
further comprising
an active filter downstream of said drum filter device;
and optionally a passive filter device positioned downstream of said active filter device and upstream of said main fan system.

* * * * *